(12) United States Patent
Funada

(10) Patent No.: US 11,300,316 B2
(45) Date of Patent: Apr. 12, 2022

(54) AIR BLOWING DEVICE AND INDOOR AIR CONVEYING SYSTEM USING SAME

(71) Applicant: Panasonic Intellectual Property Management Co., Ltd., Osaka (JP)

(72) Inventor: Naoyuki Funada, Aichi (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 292 days.

(21) Appl. No.: 16/492,148

(22) PCT Filed: Mar. 16, 2018

(86) PCT No.: PCT/JP2018/010502
§ 371 (c)(1),
(2) Date: Sep. 8, 2019

(87) PCT Pub. No.: WO2018/180607
PCT Pub. Date: Oct. 4, 2018

(65) Prior Publication Data
US 2020/0049367 A1    Feb. 13, 2020

(30) Foreign Application Priority Data

Mar. 31, 2017 (JP) .............................. JP2017-069650

(51) Int. Cl.
*F24F 13/02* (2006.01)
*F24F 7/06* (2006.01)
(Continued)

(52) U.S. Cl.
CPC .......... *F24F 13/0236* (2013.01); *F24F 7/065* (2013.01); *F24F 11/0001* (2013.01);
(Continued)

(58) Field of Classification Search
CPC .... F24F 7/065; F24F 11/0001; F24F 13/0236; F24F 13/06; F24F 13/085; F24F 13/1413; F24F 7/15; B01D 46/448
(Continued)

(56) References Cited

U.S. PATENT DOCUMENTS

2009/0186572 A1* 7/2009 Farrell .................... F24F 13/06
                                                                         454/256
2015/0300677 A1   10/2015 Wang

FOREIGN PATENT DOCUMENTS

JP       S46-29323 Y1    10/1971
JP       07243683 A  *   9/1995
(Continued)

OTHER PUBLICATIONS

International Search Report for corresponding Application No. PCT/JP2018/010502, dated May 15, 2018.

*Primary Examiner* — Allen R. B. Schult
(74) *Attorney, Agent, or Firm* — Renner, Otto, Boisselle & Sklar, LLP

(57) ABSTRACT

An air blowing device includes a housing, a partition plate, an air blower, dampers, and a controller. The housing has a first side surface and a second side surface. The first side surface has inlet A and outlet A. The second side surface has inlet B and outlet B. The partition plate divides the hollow space of the housing into an upstream section and a downstream section. The upstream and downstream sections communicate with each other. The air blower conveys air from the upstream section to the downstream section. The dampers open and close the openings of inlets A and B, and outlets A and B. The controller controls air blowing of the air blower and opening and closing of each damper. Inlets A and B are disposed in the upstream section. Outlets A and B are disposed in the downstream section.

11 Claims, 8 Drawing Sheets

(51) Int. Cl.
  *F24F 11/00* (2018.01)
  *F24F 13/06* (2006.01)
  *F24F 13/08* (2006.01)
  *F24F 13/14* (2006.01)
  *F24F 13/15* (2006.01)
  *B01D 46/44* (2006.01)
(52) U.S. Cl.
  CPC ............ *F24F 13/06* (2013.01); *F24F 13/085* (2013.01); *F24F 13/1413* (2013.01); *F24F 13/15* (2013.01); *B01D 46/448* (2013.01)
(58) Field of Classification Search
  USPC ....................................................... 454/284
  See application file for complete search history.

(56) References Cited

FOREIGN PATENT DOCUMENTS

| | | |
|---|---|---|
| JP | H11-223370 A | 8/1999 |
| JP | 2004-245495 A | 9/2004 |
| JP | 2005-69619 A | 3/2005 |
| JP | 2016-508209 A | 3/2016 |
| WO | 2014/136209 A1 | 9/2014 |

\* cited by examiner

AIR BLOWING DEVICE AND INDOOR AIR CONVEYING SYSTEM USING SAME

TECHNICAL FIELD

The present disclosure relates to an air blowing device which conveys air between adjacent spaces in a building including a plurality of spaces (rooms), such as in a home, and an indoor air conveying system using the air blowing device.

BACKGROUND ART

Conventionally, a ventilation system as described below is known in air conditioning in homes and the like (for example, Patent Literature (PTL) 1).

Homes with a conventional ventilation system includes outlets in rooms and inlets in areas other than the rooms. The wall between a room and an adjacent area other than the room includes an opening, that is, an air distribution means. The outlet feeds outside air into the room via a means of blowing supply air. In contrast, the inlet sucks the air in the area other than the room, and exhausts the air to the outside. Since the air is exhausted from the area other than the room to the outside, the air in the room flows into the area other than the room via the air distribution means.

As described above, the conventional ventilation system supplies fresh outside air into a room, and exhausts air which got dirty in the room to the outside via the air distribution means and the area other than the room.

CITATION LIST

Patent Literature

PTL 1: Japanese Unexamined Patent Application Publication No. 2005-69619

SUMMARY (SUMMARY OF THE INVENTION)

Such a conventional ventilation system performs air conditioning in a room, and exhausts cooled air or warmed air to an area other than the room, and further to the outside. Although the air cooled in the room or the air warmed in the room is supplied to the area other than the room, the air is then exhausted. Such a ventilation system has a problem in that energy is wastefully generated.

The present disclosure has been conceived to solve the conventional problem described above. An object of the present disclosure is to achieve efficient central air conditioning by being flexible in mutually moving air between adjacent rooms, that is, between adjacent spaces, depending on the state of each room.

In order to achieve the object, an air blowing device according to one aspect of the present disclosure includes: a housing having a hollow tube shape, the housing having a first side surface and a second side surface opposite to the first side surface, the first side surface having an inlet A and an outlet A, the second side surface having an inlet B and an outlet B; a partition plate which divides a hollow space of the housing into an upstream section and a downstream section which communicate with each other; an air blower which conveys air from the upstream section to the downstream section; dampers each disposed in a different one of the inlet A, the inlet B, the outlet A, and the outlet B, each of the dampers opening and closing an opening of a corresponding one of the inlet A, the inlet B, the outlet A, and the outlet B; and a controller which controls air blowing of the air blower and opening and closing of each of the dampers. The inlet A and the inlet B are disposed in the upstream section, and the outlet A and the outlet B are disposed in the downstream section.

An air blowing device according to one aspect of the present disclosure is capable of feeding air from the space toward which the first side surface faces to the space toward which the second side surface faces by controlling the opening and closing of the dampers. In contrast, the air blowing device is also capable of feeding air from the space toward which the second side surface faces to the space toward which the first side surface faces. In other words, air can be mutually moved between adjacent spaces. Efficient central air conditioning can be achieved by appropriately selecting the movement of the air.

DESCRIPTION OF EMBODIMENTS

Hereinafter, embodiments of the present disclosure will be described with reference to the drawings.

First Embodiment

Figure 1:
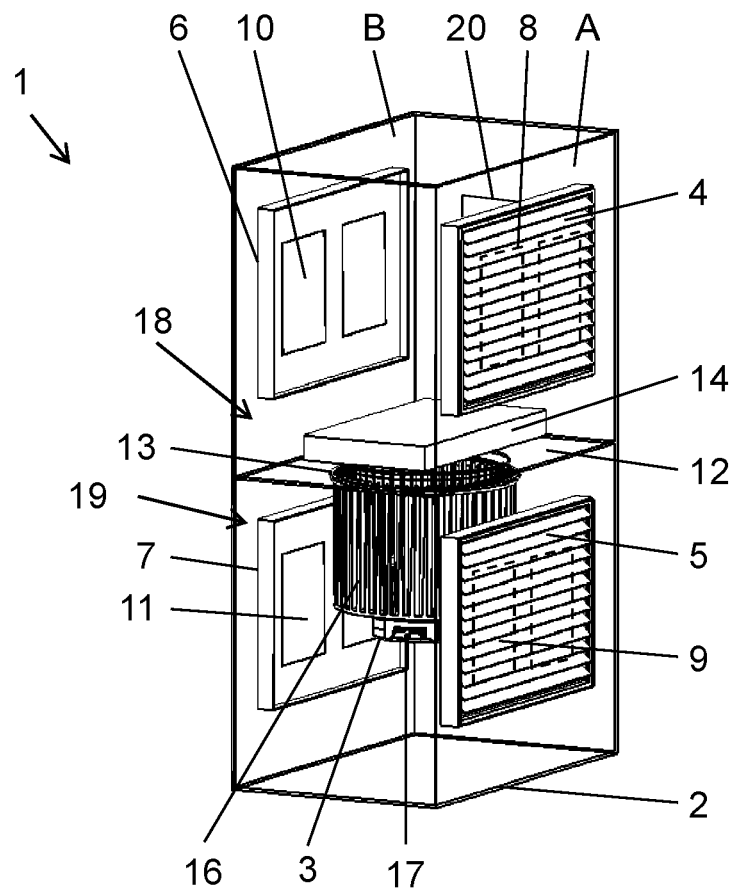
FIG. 1 is a perspective view of an air blowing device included in an indoor air conveying system according to a first embodiment of the present disclosure.

As illustrated in FIG. 1, air blowing device 1 according to the present embodiment includes hollow rectangular housing 2, and air blower 3 disposed inside housing 2. Housing 2 has first side surface A and second side surface B opposite to first side surface A. First side surface A has inlet A4 and outlet A5. Second side surface B has inlet B6 and outlet B7. Although housing 2 has a hollow rectangular tube shape in the present embodiment, the present disclosure is not limited to such an example. The shape of housing 2 may be any hollow tube shape, and may include a partially curved portion.

Inlet A4 and inlet B6 are disposed at approximately opposite positions. Outlet A5 and outlet B7 are disposed at approximately opposite positions.

Dampers which are inlet damper A8, outlet damper A9, inlet damper B10, and outlet damper B11 are respectively disposed in openings which are inlet A4, outlet A5, inlet B6, and outlet B7 so as to be able to open and close the corresponding openings. For example, opening inlet damper A8 allows air to pass through inlet A4, and closing inlet damper A8 prevents air from passing through inlet A4.

Each of inlet damper A8, outlet damper A9, inlet damper B10, and outlet damper B11 may be a so-called shutter damper including a plurality of rectangular flat blades. The long sides of the blades are disposed adjacent to each other, and the blades are pivotally connected about the long sides. The occupied area of the shutter dampers when the dampers are opened can be made relatively small, which allows the size of air blowing device 1 to be reduced.

Air blower 3 includes impeller 16 and electric motor 17. The type of impeller 16 is not limited. A centrifugal impeller may be used as impeller 16. Impeller 16 has a hollow cylindrical shape which has an inlet on the top surface. Electric motor 17 is connected to the bottom surface of impeller 16 via a rotating shaft. The top and bottom surfaces of impeller 16 are connected by a plurality of blades arranged on the curved surface of the cylindrical shape, that is, on the air blowing side surface. By being rotated by electric motor 17, impeller 16 sucks air into the inner space of the centrifugal impeller through the inlet on the top surface, and exhausts the air through the air blowing side surface.

The rotating shaft of impeller 16 is disposed approximately parallel to first side surface A and second side surface B.

The hollow space inside housing 2 is divided into two, which are upstream section 18 and downstream section 19, by partition plate 12. Partition plate 12 is a flat plate with a rectangular outer periphery. Partition plate 12 has, at the approximately central portion, an opening, that is, inlet 13, corresponding to the shape of the inlet of impeller 16. Inlet of air blower 3 is disposed close to inlet 13 of partition plate 12. Upstream section 18 and downstream section 19 communicate with each other via inlet 13. The upstream side to partition plate 12 is upstream section 18, and the downstream side to partition plate 12 is downstream section 19. In FIG. 1, the upper side of partition plate 12 is upstream section 18, and the lower side of partition plate 12 is downstream section 19.

Air blower 3 conveys the air from upstream section 18 to downstream section 19. Impeller 16 of air blower 3 is disposed such that the main plate of impeller 16 is located farther from partition plate 12, and inlet of impeller 16 is located closer to partition plate 12. Inlet of impeller 16 is opposite to inlet 13 of partition plate 12. Inlet 13 of partition plate 12 has an orifice shape. With such an arrangement, air blower 3 is disposed in downstream section 19, and the air blowing side surface of impeller 16 is disposed so as to oppose outlet A5 and outlet B7.

Filter 14 is disposed in upstream section 18. More specifically, filter 14 is disposed so as to cover the opening of partition plate 12, that is, inlet 13. Filter 14 is a flat plate, and is disposed so as to be opposite to inlet 13. In other words, the air which has passed through filter 14 is sucked into inlet 13. Filter 14 collects dirt, dust, and so on. In other words, filter 14 purifies air. Moreover, filter 14 may additionally include a function for removing smells or the like.

Controller 20 is disposed on, for example, a side surface of housing 2 which is in upper section 18 and has no damper. Controller 20 is connected to electric motor 17, inlet damper A8, outlet damper A9, inlet damper B10, and outlet damper B11. Controller 20 controls stopping, driving, and the air volume (rotating speed) of air blower 3, and individually controls opening and closing of each damper.

Figure 2:
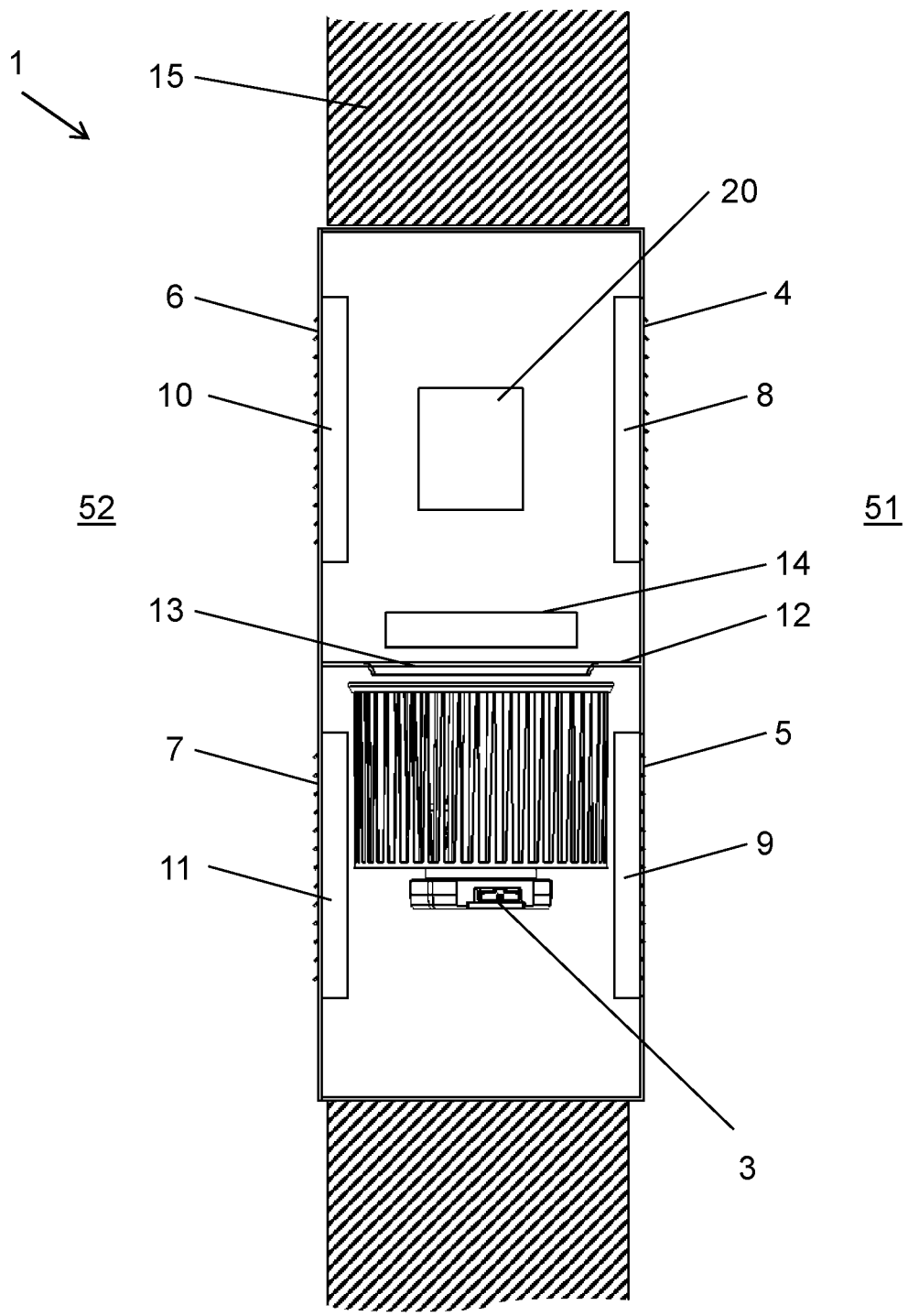
FIG. 2 is a cross-sectional view of the air blowing device.

FIG. 2 is a cross-sectional view of air blowing device 1.

As illustrated in FIG. 2, inlet A4 and inlet B6 are opposite to each other. Outlet A5 and outlet B7 are opposite to each other. Inlet A4, outlet A5, inlet B6, and outlet B7 include louvers. In inlet A4, inlet damper A8 is disposed in housing 2, on the inner side to the louvers. In a similar manner, in outlet A5, inlet B6, and outlet B7, outlet damper A9, inlet damper B10, and outlet damper B11 are disposed in housing 2, on the inner side to the louvers.

As illustrated in FIG. 2, air blowing device 1 is embodied into wall 15 so as to penetrate wall 15. In other words, air blowing device 1 is disposed so that two spaces partitioned by wall 15 communicate with each other. In the present embodiment, wall 15 partitions two spaces A51 and B52 inside the building. Air blowing device 1 is disposed so that inlet A4 and outlet A5 face toward space A51 and inlet B6 and outlet B7 face toward space B52.

An operation of air blowing device 1 will be described with reference to FIG. 3 to FIG. 5.

Figure 3:
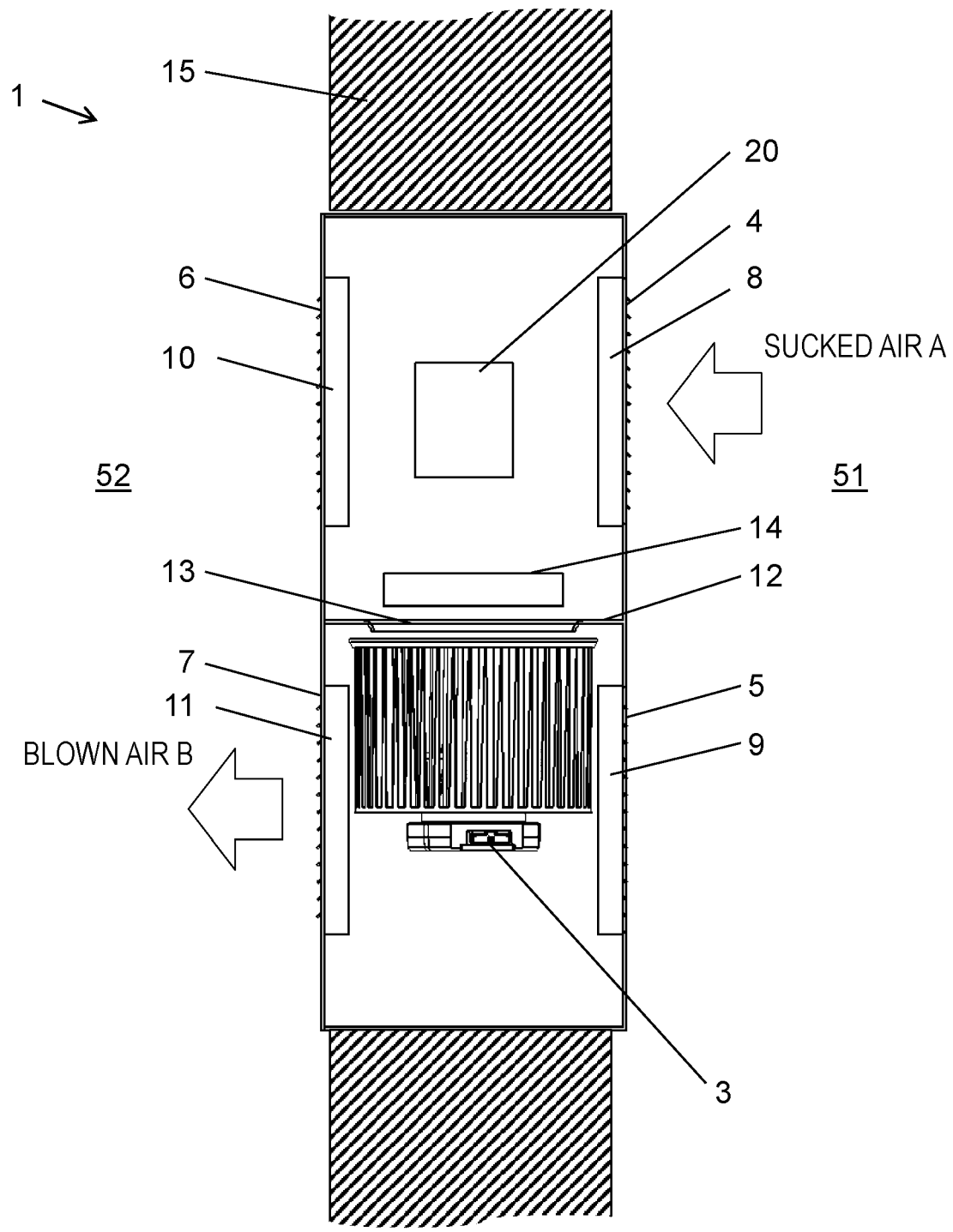
FIG. 3 illustrates a state of conveyance mode AB of the air blowing device in the indoor air conveying system.

FIG. 3 illustrates a state in which inlet damper A8 and outlet damper B11 are opened and outlet damper A9 and inlet damper B10 are closed. When air blower 3 operates in this state, an air flow is generated which passes through inlet A4, filter 14, and outlet B7 in this order. In other words, air blowing device 1 in the state of FIG. 3 conveys air from space A51 to space B52. Such a state, where inlet damper A8 and outlet damper B11 are opened and outlet damper A9 and inlet damper B10 are closed to convey air from space A51 to space B52, is defined as conveyance mode AB.

Figure 4:
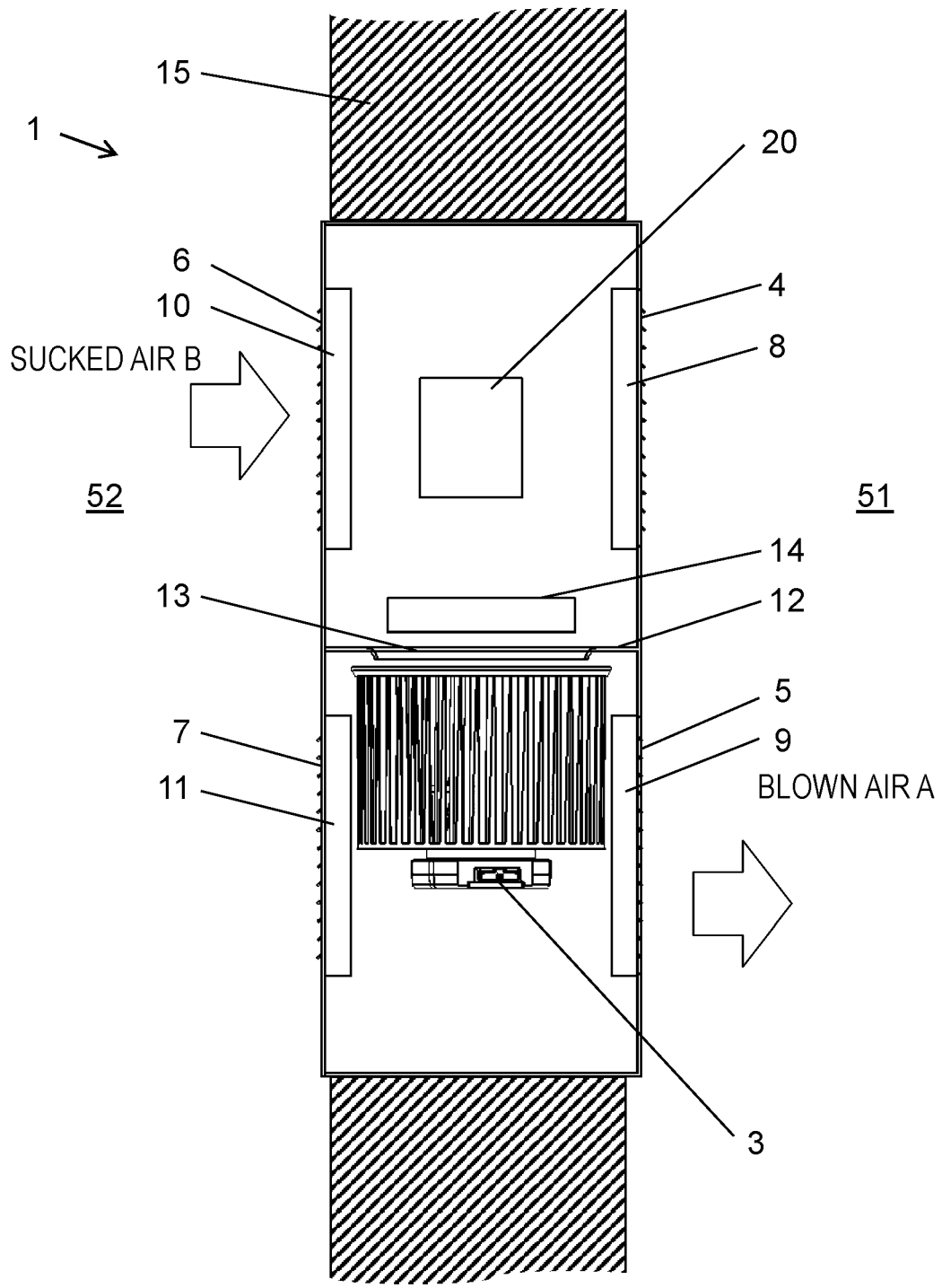
FIG. 4 illustrates a state of conveyance mode BA of the air blowing device in the indoor air conveying system.

FIG. 4 illustrates a state in which inlet damper A8 and outlet damper B11 are closed and outlet damper A9 and inlet damper B10 are opened. When air blower 3 operates in this state, an air flow is generated which passes through inlet B6, filter 14, and outlet A5 in this order. In other words, air blowing device 1 in the state of FIG. 4 conveys air from space B52 to space A51. Such a state, where inlet damper A8 and outlet damper B11 are closed and outlet damper A9 and inlet damper B10 are opened to convey air from space B52 to space A51, is defined as conveyance mode BA.

As illustrated in FIG. 3 and FIG. 4, controller 20 is capable of selectively moving air from space A51 to space B52 and from space B52 to space A51 by switching between conveyance mode AB and conveyance mode BA.

Use of the centrifugal impeller as an element of air blower 3 allows air blower 3 to blow air to any one of inlet A5 and outlet B7 which are opposite to each other. This allows efficient movement of air between space A51 and space B52 adjacent to each other.

Air blower 3 is disposed in downstream section 19. The air blowing side surface of impeller 16 is disposed so as to oppose outlet A5 and outlet B7. This allows air to be efficiently fed to any one of outlet A5 and outlet B7 which are opposite to each other.

In the present embodiment, inlet A4 and inlet B6 are disposed opposite to each other in upstream section 18, and outlet A5 and outlet B7 are disposed opposite to each other in downstream section 19. Hence, when air blowing device 1 operates in conveyance mode AB or conveyance mode BA, a level difference is generated in the blown air path as illustrated in FIG. 3 and FIG. 4. This protects the privacy of adjacent spaces.

Figure 5:
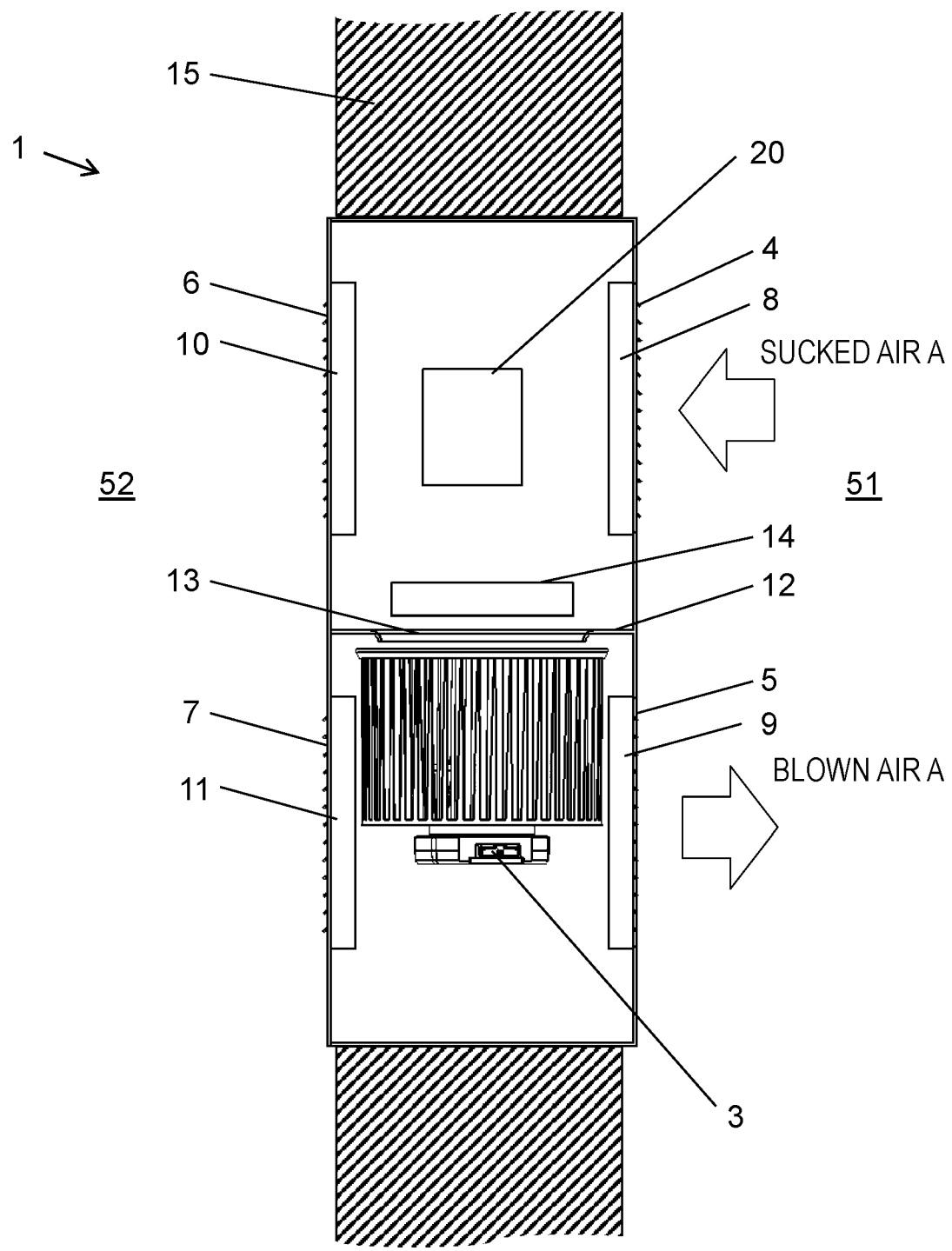
FIG. 5 illustrates a state of circulation mode A of the air blowing device in the indoor air conveying system.

FIG. 5 illustrates a state where inlet damper A8 and outlet damper A9 are opened and inlet damper B10 and outlet damper B11 are closed. When air blower 3 operates in this state, an air flow is generated which passes through inlet A4, filter 14, and outlet A5 in this order. In other words, air blowing device 1 in the state of FIG. 5 sucks the air in space A51, and supplies the air to space A51 again. Such a state, where inlet damper A8 and outlet damper A9 are opened and inlet damper B10 and outlet damper B11 are closed so that air is conveyed so as to circulate the air in space A51, is defined as circulation mode A.

In a similar manner, it is also possible to suck the air in space B52 and supply the air to space B52 again by closing inlet damper A8 and outlet damper A9 and opening inlet damper B10 and outlet damper B11. This operating state is defined as circulation mode B.

By controller 20 operating air blowing device 1 in circulation mode A or circulation mode B, the air in each space can be circulated. Moreover, air blowing device 1 purifies the air by filter 14, that is, functions as an air purifier.

Figure 6:
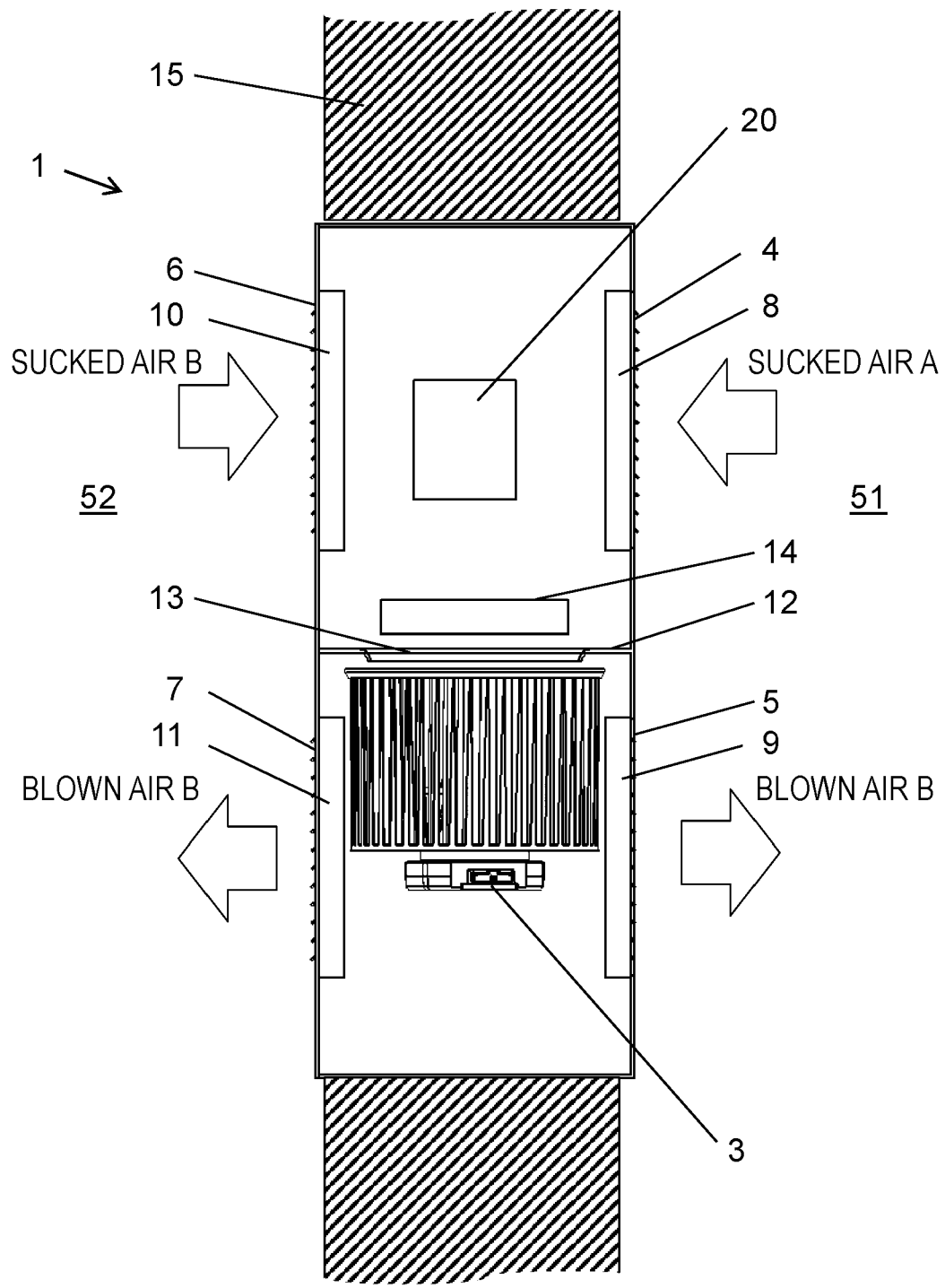
FIG. 6 illustrates a state of a full circulation mode of the air blowing device in the indoor air conveying system.

As illustrated in FIG. 6, controller 20 may open all the dampers (inlet damper A8, outlet damper A9, inlet damper B10, and outlet damper B11) to circulate air in both space A51 and space B52. In this case, the air in the two spaces can be circulated at the same time, and the air can also be purified.

For example, when air-conditioning control (for example, cooling) is being performed in space A51 while a person is present in space A51, and when air-conditioning in space B52 is unnecessary as no one is present in space B52, the environment of space A51 is maintained satisfactorily by closing all the dampers or operating air blowing device 1 in circulation mode A. In contrast, for example, when people are present not only in space A51 but also in space B52, air conditioning control in space B52 can also be performed by operating air blowing device 1 in conveyance mode AB. In other words, air can be mutually moved between adjacent rooms only when necessary as well as according to the state of each room. This allows central air conditioning to be performed efficiently with less energy.

Moreover, in the present embodiment, controller 20 is included in air blowing device 1. However, the present disclosure is not limited to such an example. Air blowing device 1 may include a communication unit capable of communicating with a central air conditioning terminal which performs central air conditioning instead of controller 20. It may be that the communication unit receives a command from the central air conditioning terminal for controlling air blower 3 and each damper, and transmits the command to air blower 3 and each (damper so that air blowing device 1 operates in one of the modes described above.

Second Embodiment

Figure 7:
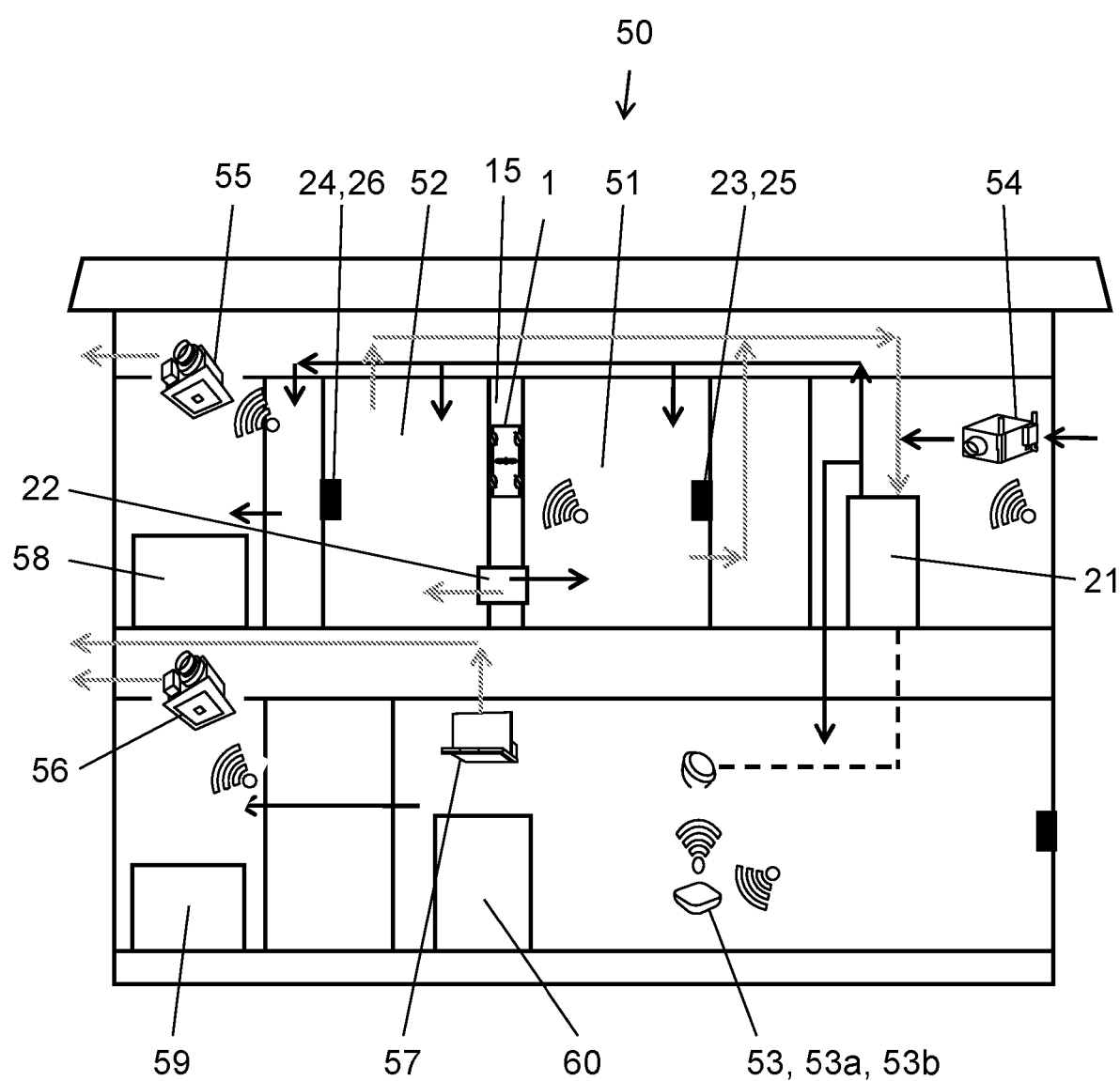
FIG. 7 illustrates an overall configuration of an indoor air conveying system.

FIG. 7 illustrates a configuration of an indoor air conveying system including air blowing device 1 described in the first embodiment. In the present embodiment, dwelling 50 is a two-story house as an example for illustration. Dwelling 50 may be an apartment or a building such as an office.

As illustrated in FIG. 7, air blowing device 1 is disposed in wall 15 which partitions space A51 and space B52. Moreover, wall 15 has opening 22 which makes space A51 and space B52 communicate with each other. In wall 15, air blowing device 1 is disposed at a position higher than opening 22. In particular, it is preferable that opening 22 is disposed near the floor and air blowing device 1 is disposed near the ceiling.

Central air conditioning is performed in dwelling 50 by air conditioner 21. In other words, supply air having temperature adjusted by air conditioner 21 (cooling air or heating air) is supplied to both space A51 and space B52 on the second floor. The supply air is also supplied to other rooms, for example, to the first floor. Note that the central air conditioning refers to air conditioning performed on entire dwelling 50. However, it may be that a partial area, for example, only the second floor is subjected to air conditioning.

Indoor sensor A23 is disposed in space A51. Indoor sensor A23 detects the room temperature of at least space A51. In the present embodiment, indoor sensor A23 also includes occupancy sensor A25. Indoor sensor A23 outputs temperature information and occupancy information of space A51. In a similar manner, indoor sensor B24 is disposed in space B52. Indoor sensor B24 detects the room temperature of at least space B52. In the present embodiment, indoor sensor B24 also includes occupancy sensor B26. Indoor sensor B24 outputs temperature information and occupancy information of space B52.

Dwelling 50 includes outside air intake fan 54 for introducing the outside air into dwelling 50. Moreover, dwelling 50 includes ventilation devices 55 and 56 and range hood 57 as devices for discharging the air in dwelling 50 to outside. Ventilation devices 55 and 56 are disposed in, for example, bathrooms 58 and 59. Range hood 57 is disposed, for example, in kitchen 60.

Dwelling 50 further includes control terminal 53 which is communicatively connected to air blowing device 1 and which is for controlling air blowing device 1. Indoor sensor A23 and indoor sensor B24 are connected to control terminal 53. Control terminal 53 receives the temperature information and the occupancy information of space A51 and space B52 transmitted from indoor sensor A23 and indoor sensor B24, and controls air blowing device 1 based on the information.

An operation of the indoor air conveying system with the above configuration, that is, control performed on air blowing device 1 by control terminal 53 will be described.

[Temperature Uniformity Control]

Control terminal 53 includes comparator 53a and selector 53b. Comparator 53a compares the room temperature of space A51 detected by indoor sensor A23 with the room temperature of space B52 detected by indoor sensor B24. Selector 53b selects a conveyance mode based on the comparison result. By appropriately selecting a conveyance mode, it is possible to operate air blowing device 1 such that the temperature difference between space A51 and space B52 is reduced. Here. Ta is the room temperature of space A51 detected by indoor sensor A23, and Tb is the room temperature of space B52 detected by indoor sensor B24. When the relation of Ta>Tb is satisfied and the difference between room temperature Ta and room temperature Tb is greater than or equal to a predetermined threshold value, control terminal 53 selects conveyance mode AB, thereby operating air blowing device 1 in conveyance mode AB. In other words, air blowing device 1 conveys the air from space A51 to space B52. On the other hand, the operation of air blowing device 1 in conveyance mode AB generates an air flow in opening 22, from space B52 to space A51. In other words, the warm air in the upper portion of space A51 flows into space B52, and cool air in the lower portion of space B52 flows into space A51. Accordingly, uniformity of the temperatures of space A51 and space B52 can be achieved, leading to efficient central air conditioning.

When the relation of Ta<Tb is satisfied, control terminal 53 determines to operate air blowing device 1 in conveyance mode BA.

[Control when Occupied]

Control terminal 53 controls air blowing device 1 based on the room temperatures of space A51 and space B52 detected by indoor sensor A23 and indoor sensor B24, and the occupancy information detected by occupancy sensor A25 and occupancy sensor B26. Control terminal 53 stores room temperature set value Ts. Room temperature set value Ts is input directly to control terminal 53 by a user. Alternatively, control terminal 53 may obtain, as room temperature set value Ts, the set value of air conditioner 21 by performing communication.

As an example, a case will be described below where occupancy sensor A25 detects the presence of a person in space A51 (occupancy). The same also applies to the case where a person is present in space B52.

When a person is present in space A51, first, control terminal 53 compares room temperature Ta of space A51 with room temperature set value Ts. Control terminal 53 then compares room temperature Tb of space B52 with room temperature Ta of space A51.

When the relations of Ta>Ts and Ta>Tb are satisfied, the cool air in space B52 is supplied to space A51, and the warm air in space A51 is discharged into space B52. By doing so, it is possible to bring the temperature of space A51 close to room temperature set value Ts. In order to achieve this, air blowing device 1 operates in conveyance mode AB. Accordingly, the cool air in the lower portion of space B52 is supplied to space A51 through opening 22. Moreover, the warm air in the upper portion of space A51 is discharged to space B52 via air blowing device 1.

In contrast, when the relations of Ta<Ts and Ta>Tb are satisfied and the cool air in space B52 is supplied to space A51, the temperature of space A51 deviates from room temperature set value Ts. Accordingly, the operation of air blowing device 1 is stopped.

When the relations of Ta<Ts and Ta<Tb are satisfied, the warm air in space B52 is supplied to space A51, and the cool air in space A51 is discharged into space B52. By doing so, it is possible to bring the temperature of space A51 close to room temperature set value Ts. In order to achieve this, air blowing device 1 operates in conveyance mode BA. Accordingly, the warm air in the upper portion of space B52 is supplied to space A51 via air blowing device 1. Moreover, the cool air in the lower portion of space A51 is discharged to space B52 through opening 22.

In contrast, when the relations of Ta>Ts and Ta<Tb are satisfied and the warm air in space B52 is supplied to space A51, the temperature of space A51 deviates from room temperature set value Ts. Accordingly, the operation of air blowing device 1 is stopped.

By operating air blowing device 1 based on the temperature information and the occupancy information of space A51 and space B52 in the above manner, air conditioning can be performed with a small amount of operational energy.

In order to provide opening 22 independently from air blowing device 1, a separate construction work is required. In order to avoid this, air blowing device 1 may have an opening corresponding to opening 22.

Figure 8:
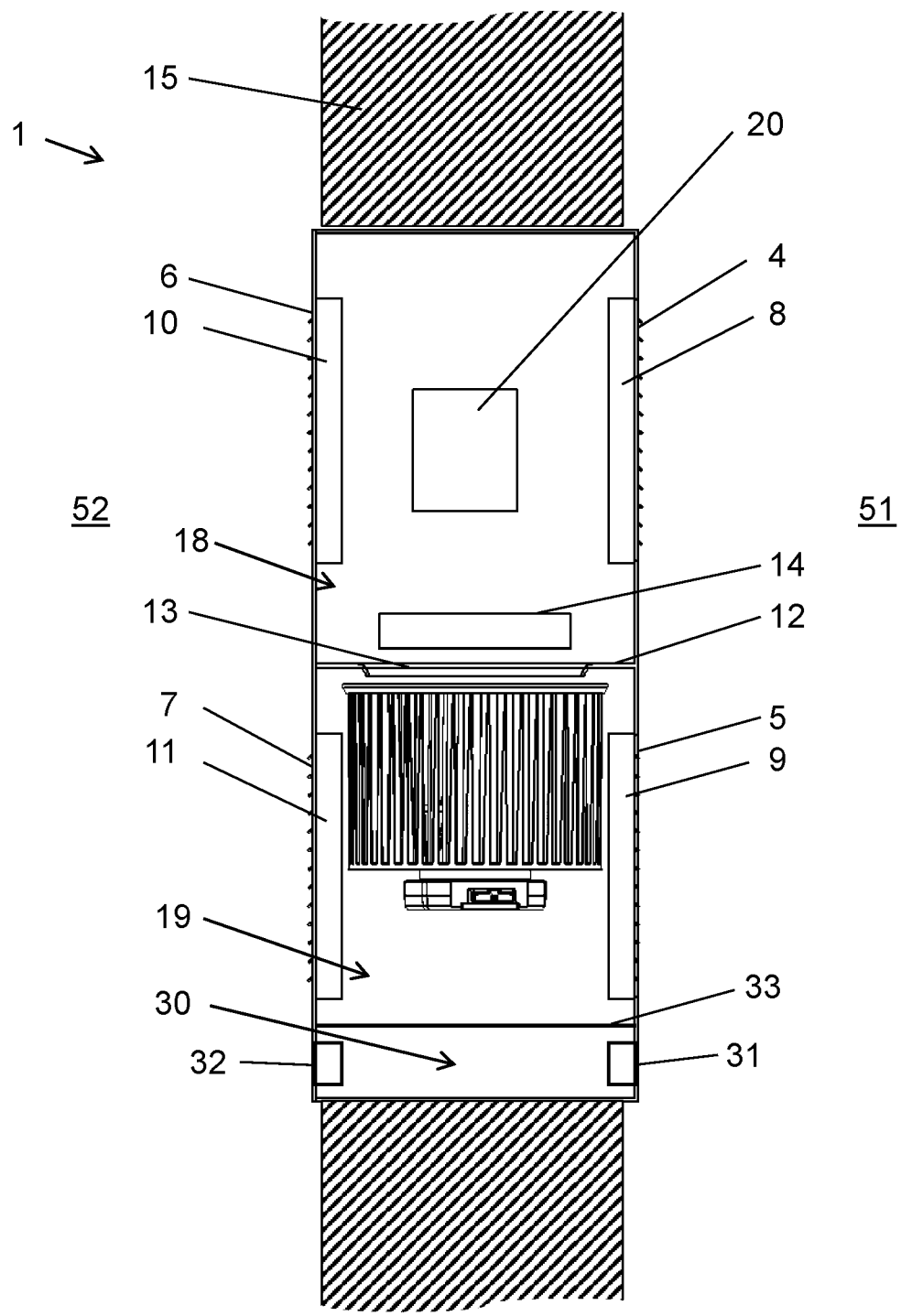
FIG. 8 is a cross-sectional view of a variation of the air blowing device.

Specifically, as illustrated in FIG. 8, air blowing device 1 includes ventilation section 30 independent from upstream section 18 and downstream section 19. Ventilation section 30 is positioned opposite to upstream section 18 across downstream section 19, that is, below downstream section 19 in FIG. 8. Ventilation section 30 is partitioned from downstream section 19 by partition plate 33. First side surface A has opening 31 corresponding to ventilation section 30 and second side surface B has opening 32 corresponding to ventilation section 30. This eliminates the need to provide opening 22 in wall 15. Only disposing air blowing device 1 including ventilation section 30 can provide the same advantageous effects as the case where opening 22 is provided.

In the second embodiment, control terminal 53 selects a conveyance mode based on the detection result of the sensor, but the present disclosure is not limited to such an example. In response to the operation performed by the user, control terminal 53 may select a conveyance mode based on the operation result.

In the second embodiment, control terminal 53 selects one of conveyance mode AB, conveyance mode BA, and non-operation. But the present disclosure is not limited to such an example. Control terminal 53 may select one of circulation mode A and circulation mode B. The selection may be based on the user operation, a sensor, or a timer. For example, air blowing device 1 may operate in circulation mode A when a person is detected to be present in space A51, and operates in circulation mode B when a person is detected to be present in space B52.

Although control terminal 53 controls the conveyance mode of air blowing device 1 in the second embodiment, the present disclosure is not limited to such an example. Instead of control terminal 53, controller 20 included in air blowing device 1 may control the conveyance mode of air blowing device 1.

INDUSTRIAL APPLICABILITY

An air blowing device according to the present disclosure is capable of conveying air between adjacent spaces, and efficiently performing central air conditioning.

REFERENCE MARKS IN THE DRAWINGS

1 air blowing device
2 housing
3 air blower
4 inlet A
5 outlet A
6 inlet B
7 outlet B
8 inlet damper A
9 outlet damper A
10 inlet damper B
11 outlet damper B
12 partition plate
13 inlet
14 filter
15 wall
16 impeller
17 electric motor
18 upstream section
19 downstream section
20 controller
21 air conditioner
22 opening
23 indoor sensor A
24 indoor sensor B
25 occupancy sensor A
26 occupancy sensor B
30 ventilation section
31 opening
32 opening
33 partition plate
19
50 dwelling
51 space A
52 space B
53 control terminal
53*a* comparator
53*b* selector

The invention claimed is:

1. An air blowing device comprising:
a housing having a hollow tube shape, the housing having a first side surface and a second side surface opposite to the first side surface, the first side surface having an inlet A and an outlet A, the second side surface having an inlet B and an outlet B;
a partition plate which divides a hollow space of the housing into an upstream section and a downstream section which communicate with each other;
an air blower which conveys air from the upstream section to the downstream section;
a plurality of dampers each disposed in a different one of the inlet A, the inlet B, the outlet A, and the outlet B, each of the plurality of dampers opening and closing an opening of a corresponding one of the inlet A, the inlet B, the outlet A, and the outlet B;
a controller which controls air blowing of the air blower and opening and closing of each of the plurality of dampers, and
a ventilation section in the housing, the ventilation section being opposite to the upstream section across the downstream section, the ventilation section being independent from the upstream section and the downstream section,
wherein the inlet A and the inlet B are disposed in the upstream section, and
the outlet A and the outlet B are disposed in the downstream section, and
the first side surface of the housing has an opening in an area corresponding to the ventilation section, and the second side surface of the housing has an opening in an area corresponding to the ventilation section.

2. The air blowing device according to claim 1,
wherein the air blower includes:
a centrifugal impeller having an inlet; and
an electric motor to which the centrifugal impeller is rotatably connected, and
the partition plate is positioned adjacent to the inlet of the centrifugal impeller.

3. The air blowing device according to claim 1,
wherein each of the plurality of dampers is a shutter damper including a plurality blades rotatably disposed adjacent to each other.

4. The air blowing device according to claim 1, further comprising
a filter in the upstream section, the filter purifying air sucked through the inlet A or the inlet B.

5. The air blowing device according to claim 4,
wherein the partition plate has an opening for making the upstream section and the downstream section communicate with each other, and
the filter is disposed so as to cover the opening of the partition plate.

6. The air blowing device according to claim 2,
wherein the centrifugal impeller further has an air blowing side surface, and
the air blower is disposed so that the air blowing side surface of the centrifugal impeller faces the outlet A and the outlet B.

7. An indoor air conveying system comprising
the air blowing device according to claim 1,
wherein the air blowing device is disposed in a wall which partitions two indoor spaces including a space A and a space B, so that the space A and the space B communicate with each other,
the inlet A and the outlet A are disposed so as to face toward the space A,
the inlet B and the outlet B are disposed so as to face toward the space B,
when air is to be conveyed between the space A and the space B, the controller switches between a conveyance mode AB and a conveyance mode BA, the conveyance mode AB being a mode in which a damper of the inlet A and a damper of the outlet B are opened, and a damper of the inlet B and a damper of the outlet A are closed among the dampers, the conveyance mode BA being a mode in which the damper of the inlet A and the damper of the outlet B are closed, and the damper of the inlet B and the damper of the outlet A are opened.

8. The indoor air conveying system according to claim 7,
wherein the wall has an opening at a position lower than the air blowing device, the opening making the space A and the space B communicate with each other.

9. The indoor air conveying system according to claim 7, further comprising
an indoor sensor A which detects a temperature of the space A; and
an indoor sensor B which detects a temperature of the space B,
wherein the controller includes:
a comparator which compares the temperature of the space A detected by the indoor sensor A with the temperature of the space B detected by the indoor sensor B; and
a selector which selects one of the conveyance mode AB and the conveyance mode BA according to a result of the comparison made by the comparator.

10. The indoor air conveying system according to claim 7, further comprising:
an occupancy sensor disposed in at least one of the space A and the space B;
an indoor sensor A which detects a temperature of the space A; and
an indoor sensor B which detects a temperature of the space B,
wherein the controller includes:
a comparator which compares at least one of the temperature of the space A detected by the indoor sensor A and the temperature of the space B detected by the indoor sensor B with a predetermined room temperature set value; and
a selector which selects one of the conveyance mode AB and the conveyance mode BA so as to bring a temperature of a space determined to be occupied based on the occupancy sensor close to the room temperature set value.

11. An indoor air conveying system comprising
the air blowing device according to claim 1,
wherein the air blowing device is disposed in a wall which partitions two indoor spaces including a space A and a space B, so that the space A and the space B communicate with each other,
the inlet A and the outlet A are disposed so as to face toward the space A,
the inlet B and the outlet B are disposed so as to face toward the space B,
when air in the space A is to be circulated, the controller selects a circulation mode A in which a damper of the inlet A and a damper of the outlet A are opened and a damper of the inlet B and a damper of the outlet B are closed among the dampers, and when air in the space B is to be circulated, the controller selects a circulation mode B in which the damper of the inlet A and the damper of the outlet A are closed, and the damper of the inlet B and the damper of the outlet B are opened.

\* \* \* \* \*